United States Patent
Hodrus

(10) Patent No.: US 12,155,337 B2
(45) Date of Patent: Nov. 26, 2024

(54) ELECTRIC MOTOR DEVICE AND METHOD FOR CONTROLLING A MOTOR BRAKING PROCEDURE FOR AN ELECTRIC MOTOR

(71) Applicant: Schaeffler Technologies AG & Co. KG, Herzogenaurach (DE)

(72) Inventor: Erhard Hodrus, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 156 days.

(21) Appl. No.: 17/908,547

(22) PCT Filed: Feb. 5, 2021

(86) PCT No.: PCT/DE2021/100111
§ 371 (c)(1),
(2) Date: Sep. 1, 2022

(87) PCT Pub. No.: WO2021/175360
PCT Pub. Date: Sep. 10, 2021

(65) Prior Publication Data
US 2023/0145914 A1 May 11, 2023

(30) Foreign Application Priority Data
Mar. 5, 2020 (DE) .................. 10 2020 105 950.7

(51) Int. Cl.
*H02P 3/22* (2006.01)
(52) U.S. Cl.
CPC ..................... *H02P 3/22* (2013.01)
(58) Field of Classification Search
CPC ........................................................ H02P 3/22
(Continued)

(56) References Cited

U.S. PATENT DOCUMENTS

2020/0059172 A1* 2/2020 Benarous .................. H02P 3/22
2020/0130127 A1* 4/2020 Yoshinari .................. H02P 3/22

FOREIGN PATENT DOCUMENTS

DE          69324830 T2      1/2000
DE       102012002023 A1   12/2012
(Continued)

OTHER PUBLICATIONS

Lu et al. (CN 108964572 A) A Method And System For Electric Motor Driving A Short Circuit Control Date Published Dec. 7, 2018 (Year: 2018).*

(Continued)

*Primary Examiner* — Jorge L Carrasquillo
(74) *Attorney, Agent, or Firm* — Volpe Koenig

(57) ABSTRACT

A motor braking procedure is controlled for an electric motor that provides a drive torque for a vehicle and is driven electrically by an inverter circuit having a plurality of switching elements via at least two motor connections and has a rotor rotatable at a motor speed. A braking switch position is adopted by the inverter circuit in braking switch position intervals. An open switch position is adopted by the inverter circuit in open switch position intervals. The braking switch position intervals are alternately switched with the open switch position intervals based on a motor speed being less than a limit speed during the motor braking procedure. The rotor, during the electric motor braking procedure, is subject to a speed-dependent braking torque based on the inverter circuit adopting a braking switch position and is subject to a braking torque less than that in the braking switch position or no braking torque based on the inverter circuit adopting an open switch position.

15 Claims, 3 Drawing Sheets

(58) Field of Classification Search
USPC .......................................................... 318/375
See application file for complete search history.

(56) References Cited

FOREIGN PATENT DOCUMENTS

| DE | 102011081173 A1 | 2/2013 |
| DE | 102014217005 A1 | 3/2016 |
| DE | 102017111108 A1 | 11/2018 |
| DE | 212017000256 U1 | 7/2019 |
| EP | 0742637 A1 | 11/1996 |

OTHER PUBLICATIONS

Beckmann et al. (DE 102014217005 A1) Method For Braking A Compressor And Compressors Of A Refrigerating Appliance, Air Conditioner Or A Heat Pump And Refrigeration Device, Air Conditioner Or Heat Pump With It Date Published Mar. 3, 2016 (Year: 2016).*

* cited by examiner

ELECTRIC MOTOR DEVICE AND METHOD FOR CONTROLLING A MOTOR BRAKING PROCEDURE FOR AN ELECTRIC MOTOR

CROSS-REFERENCE TO RELATED APPLICATIONS

This application is the U.S. National Phase of PCT Appln. No. PCT/DE2021/100111 filed Feb. 5, 2021, which claims priority to DE 102020105950.7 filed Mar. 5, 2020, the entire disclosures of which are incorporated by reference herein.

BACKGROUND

DE 10 2017 111 108 A 1 describes a method for braking a vehicle in the event of a transmission failure. It describes that the braking procedure is carried out via a wheel brake if a transmission fault occurs.

The vehicle is at least in a safe state when it is no longer in motion. Apart from the possibility of using the vehicle brakes arranged on the vehicle wheels to brake the vehicle or also in the event of a malfunction of the vehicle brakes, a braking procedure can take place via an electric motor acting as a drive element of the vehicle. The electric motor has a rotor able to rotate at a motor speed and is electrically controlled via motor connections through an inverter circuit that has a plurality of switching elements.

A motor braking procedure can be initiated by adopting a braking switch position of the inverter circuit, in which at least two motor connections are short-circuited. The resulting braking torque is dependent on the motor speed of the rotor. At lower motor speeds, an undesirable increase in motor braking torque can occur, which can induce excessive braking on the vehicle, which in turn can affect the safety of the vehicle.

SUMMARY

The disclosure, according to an exemplary embodiment, improves motor braking. A motor braking procedure can be controlled to allow the braking torque to be applied more consistently at lower motor speeds. The vehicle can be braked in a more stable and smoother manner. The braking of the vehicle can be carried out more safely. The vehicle can be prevented from swerving due to motor braking.

The electric motor can be arranged in an electric vehicle. The electric motor can be non-rotatably connected to a vehicle wheel. A transmission can be effectively arranged between the electric motor and the vehicle wheel.

The electric motor can have several motor phases. The motor phases can each be connected to an inverter circuit via motor connections. The electric motor can be a brushless direct current motor. The electric motor can have three motor phases.

The inverter circuit can be a half-bridge circuit. The half-bridge circuit can be a multiple half-bridge circuit, in particular a triple half-bridge circuit.

A limit speed can be less than or equal to 3000 rpm.

During the motor braking procedure, braking parameters, in particular an alternate switching frequency, a time period of the individual braking switch position intervals and/or a time period of the individual open switch position intervals, can be specified as a function of a motor speed and can be called up during operation of the vehicle. These braking parameters can also be controlled in an adapted manner depending on acceleration information and/or regulated to regulate the braking torque.

Motor braking can be initiated during emergency braking.

In an embodiment of the disclosure, the time period of the individual braking switch position intervals is set depending on the motor speed. Below the limit speed, the time period of the individual braking switch position intervals can be proportional to the motor speed.

In an embodiment of the disclosure, the time period of the individual open switch position intervals is set depending on the motor speed. Below the limit speed, the time period of the individual open switch position intervals can be proportional to the motor speed.

In an embodiment of the disclosure, the time period of at least one braking switch position interval differs from the time period of at least one subsequent open switch position interval.

In an embodiment of the disclosure, at least two motor connections are electrically short-circuited in the braking switch position. In the braking switch position, at least two switching elements assigned to the same voltage potential of the supply voltage can be closed. All switching elements assigned to the same voltage potential of the supply voltage can also be closed.

In an embodiment of the disclosure, the majority of the switching elements in the open switch position are in a blocking position. In the blocking position, power transmission is interrupted.

In an embodiment of the disclosure, all switching elements are in the blocking position in the open switch position.

In an embodiment of the disclosure, during motor braking at motor speeds above the limit speed, the braking switch position is adopted without interruption.

In an embodiment of the disclosure, the limit speed corresponds to a motor speed at which the voltage induced by the rotor due to the open switch position at the switching elements is below a limit voltage. As a result, the voltage load on the switching elements can be reduced in the open switch position.

Furthermore, an electric motor device is proposed for providing a drive torque for a vehicle, having an electric motor having a rotatable rotor, which is subject to a braking torque during an electric motor braking procedure and can be rotated at a motor speed, and an inverter circuit for controlling the motor braking procedure through a method with at least one of the features described above.

Further advantages and advantageous embodiments of the disclosure are apparent from the description of the figures as well as the figures themselves.

BRIEF DESCRIPTION OF THE DRAWINGS

The disclosure is described in detail below with reference to the figures. In the figures.

DETAILED DESCRIPTION

Figure 1:
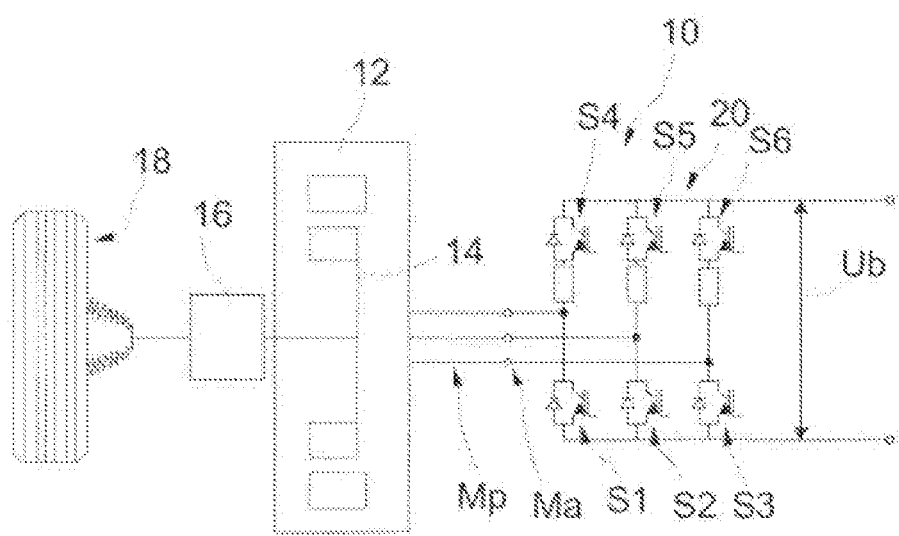
FIG. 1: shows an electric motor device in an exemplary embodiment of the disclosure.

FIG. 1 shows an electric motor device 10 in an exemplary embodiment of the disclosure. The electric motor device 10 is arranged in a vehicle to provide a drive torque and has an electric motor 12 having a rotor 14 able to rotate at a motor speed. The electric motor 12 can output a drive torque for driving the vehicle via a transmission 16 to a vehicle wheel 18 of the vehicle. The rotor 14 can be connected to the vehicle wheel 18 in a rotationally fixed manner via the transmission 16.

The electric motor 12 can be a brushless DC motor that is controllable by an inverter circuit 20. The electric motor 12 can have three motor phases Mp. The respective motor phase Mp is connected to the inverter circuit 20 via a motor connection Ma. The inverter circuit 20 is fed by a supply voltage Ub, which is preferably a DC voltage. The supply voltage Ub can be provided by a vehicle battery. The vehicle can preferably be an electric vehicle.

The inverter circuit 20 is in particular a multiple half-bridge circuit, here a triple half-bridge circuit for driving the three motor phases Mp. The inverter circuit 20 has six switching elements S1-S6. An electrical motor braking procedure for triggering a braking torque by rotor 14 is preferably set by the inverter circuit 20 adopting a braking switch position in which at least two of the motor connections Ma are short-circuited via the inverter circuit 20. In particular, all three motor phases Mp can be short-circuited by the three switching elements S1-S3 being switched on or the other three switching elements S4-S6 being switched on.

When the inverter circuit 20 is in an open switch position, the braking torque caused by the rotor 14 is less than in the braking switch position or no braking torque is present at all. The open switch position can be adopted when all switching elements S1-S6 are switched to a blocking position. However, a rotational movement of the rotor 14 can then produce an induced voltage at the switching elements S1-S6, which loads the switching elements S1-S6 and is speed dependent. The induced voltage is proportional to the motor speed.

Figure 2:
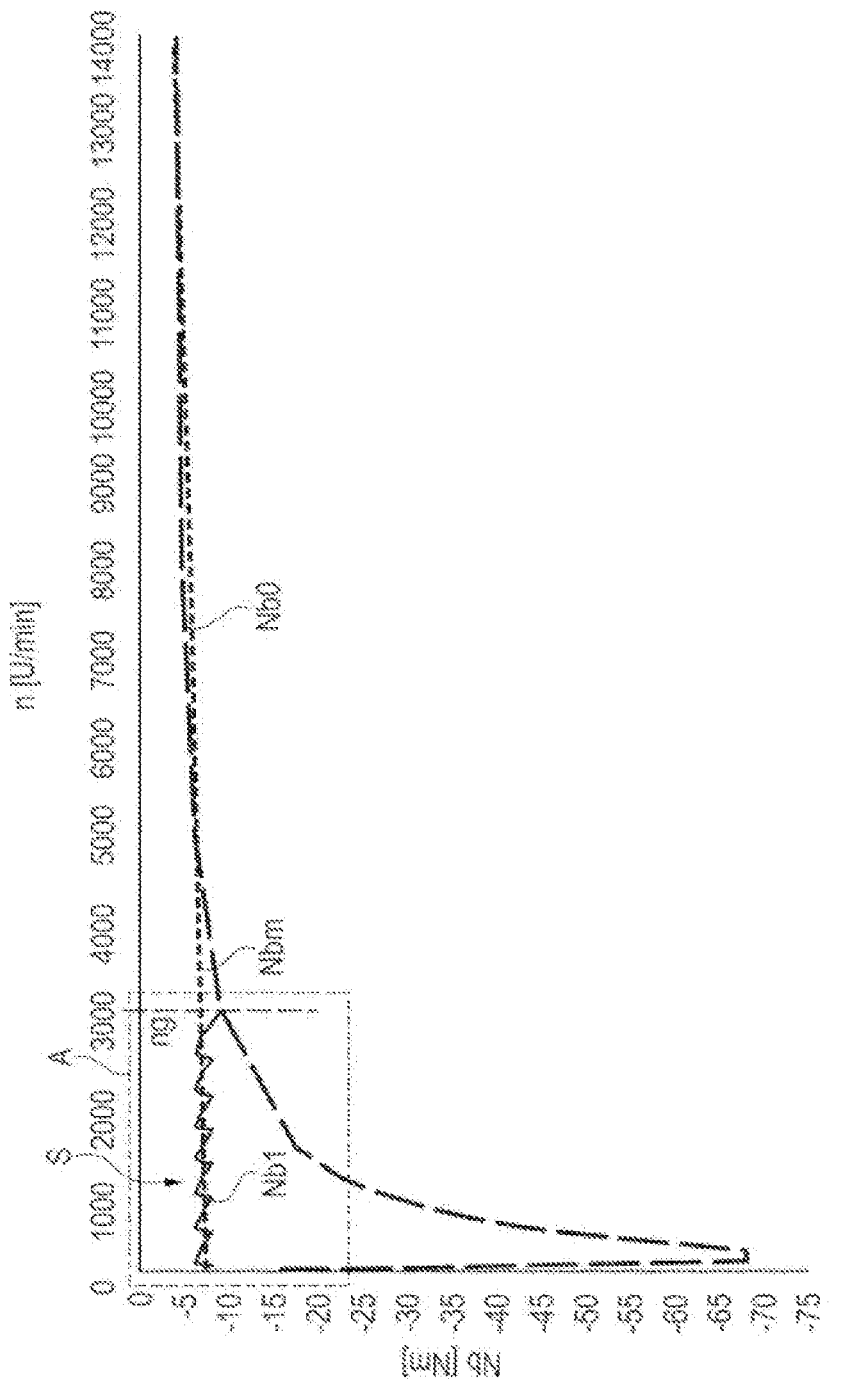
FIG. 2: shows a braking torque curve in the embodiment of a method in an exemplary embodiment of the disclosure.

FIG. 2 shows a braking torque curve in the embodiment of a method in an exemplary embodiment of the disclosure. The motor braking procedure brought about by a braking switch position of the inverter circuit adopted entirely without interruption via the motor speed n enacts a speed-dependent braking torque Nb on the rotor. The braking torque Nb is inversely proportional to the motor speed n. At low motor speeds, the braking torque Nb can therefore have high values.

Assuming that the electric motor is to be braked by the electric motor braking procedure starting from a high motor speed n, then the braking torque Nb will change only slightly up to a limit speed ng of 3000 rpm here and increase from the limit speed ng with increasingly lower motor speeds n. As a result, the vehicle is braked more strongly at lower motor speeds n and can even swerve due to the excessive braking torque Nb, depending on the road conditions.

For this reason, during the motor braking procedure at motor speeds n below the limit speed ng, the braking switch position is adopted by alternate switching S in braking switch position intervals alternating with open switch position intervals of the open switch position. The resulting braking torque curve Nb1 is thus adjusted on average to the braking torque curve Nb0 at motor speeds n above the limit speed ng. As a result, the braking torque Nb can be applied more consistently over the motor speeds n and a more consistent average braking torque Nbm can be achieved. The vehicle can be braked in a more stable and smoother manner, and the braking procedure of the vehicle can be carried out more safely. The vehicle can be prevented from swerving due to motor braking.

Figure 3:
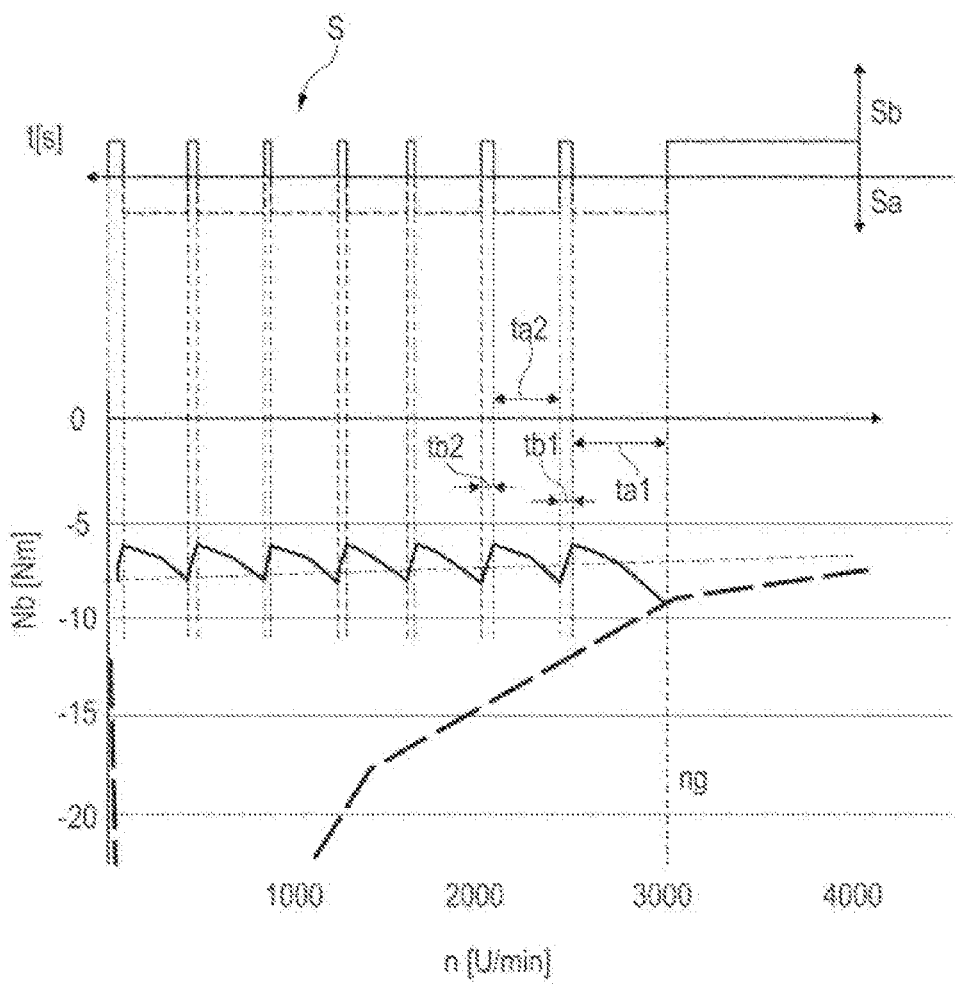
FIG. 3: shows detail A from FIG. 2 in an enlarged view.

FIG. 3 shows detail A from FIG. 2 in an enlarged view. The alternate switchings S between the braking switch position Sb and the open switch position Sa, which are dependent on the motor speed n, are also shown. Starting with a rotor rotating at a motor speed n above the limit speed ng and the motor braking procedure initiated by the braking switch position Sb of the inverter circuit being adopted without interruption up to the limit speed ng, the braking switch position Sb is replaced by the open switch position Sa when the limit speed ng is reached. The open switch position Sa is maintained over a first time period ta1. During this time, the braking torque Nb is reduced.

After the first time period ta1 has elapsed, the open switch position Sa is replaced and the braking switch position Sb is adopted for a first time period tb1. Then, the open switch position Sa alternates with the braking switch position Sb again for a second time period ta2. After the second time period ta2 has elapsed, the braking switch position Sb is adopted again for a second time period tb2. These alternate switchings S take place in particular until the rotor no longer rotates.

The first time period ta1 is greater than the subsequent second time period ta2 of the respective open switch positions Sa, since the braking torque Nb, starting from the motor speed n that has reached the limit speed ng, is to be reduced more than in the further course of the alternate switching S. The respective time period of the open switch position and the braking switch position, as well as the alternate switching frequency, for example 14 alternate switchings S are available here, can be selected from the required curve for the braking torque Nb and, for example, adapted to ambient conditions.

LIST OF REFERENCE SYMBOLS

10 Electric motor device
12 Electric motor
14 Rotor
16 Transmission
18 Vehicle wheel
20 Inverter circuit
Ma Motor connection
Mp Motor phase
n Motor speed
ng Limit speed
Nb Braking torque
Nb0 Braking torque curve
Nb1 Braking torque curve
Nm Average braking torque
S Alternate switching
S1-S6 Switching element
S a Open switch position
Sb Braking switch position
ta1 First time period
ta2 Second time period
tb1 First time period
tb2 Second time period
Ub Supply voltage

The invention claimed is:

1. A method for controlling a motor braking procedure of an electric motor that provides a drive torque for a vehicle and is driven electrically by an inverter circuit having a plurality of switching elements via a plurality of motor connections and has a rotor rotatable at a motor speed, the method comprising:

adopting, via the inverter circuit, a braking switch position in braking switch position intervals, the rotor being subjected to a speed-dependent braking torque when the braking switch position is adopted;

adopting, via the inverter circuit, an open switch position in open switch position intervals, the rotor being subjected to no braking torque or a braking torque that is less than the speed-dependent braking torque when the open switch position is adopted; and alternately switching, via the inverter circuit, between the braking switch position intervals and the open switch position intervals based on a motor speed being below a limit speed during the motor braking procedure;

wherein adopting the braking switch position is without interruption based on the motor speed being greater than the limit speed during the motor braking procedure; and wherein a respective time period of each open switch position interval is dependent on the motor speed, with a first time period being greater than a subsequent time period;

wherein a slope of the speed dependent braking torque at motor speeds greater than the limit speed is approximated by the slope of the speed dependent braking torque at motor speeds below the limit speed.

2. The method according to claim 1, wherein a respective time period of each braking switch position intervals is dependent on the motor speed.

3. The method according to claim 1, wherein a respective time period of each open switch position intervals is dependent on the motor speed.

4. The method according to claim 1, wherein a time period of at least one braking switch position interval is different from a time period of the subsequent open switch position interval.

5. The method according to claim 1, wherein at least two of the motor connections are electrically short-circuited in the braking switch position.

6. The method according to claim 1, wherein, in the open switch position, a majority of the switching elements are in a blocking position.

7. The method according to claim 6, wherein, in the open switch position, all of the switching elements are in the blocking position.

8. The method according to claim 1, wherein the limit speed corresponds to a motor speed at which a voltage at the switching elements induced through the open switch position of the rotor is below a limit voltage.

9. An electric motor device for providing a drive torque for a vehicle, comprising:

an electric motor having a rotatable rotor which is subject to a braking torque during an electric motor braking procedure and which is able to rotate at a motor speed, and an inverter circuit having a plurality of switching elements in communication with the electric motor via a plurality of motor connections and being configured to, during a motor braking procedure: actuate the plurality of switching elements to adopt a braking switch position in braking switch position intervals, the rotor being subjected to a speed-dependent braking torque when the braking switch position is adopted;

actuate the plurality of switching elements to adopt an open switch position in open switch position intervals, the rotor being subjected to no braking torque or a braking torque that is less than the speed-dependent braking torque when the open switch position is adopted; and adopt the braking switch position without interruption based on the motor speed being greater than a limit speed;

alternately switch between the braking switch position intervals and the open switch position intervals based on a motor speed being below a limit speed;

wherein a respective time period of each open switch position interval is dependent on the motor speed, with a first time period being greater than a subsequent time period;

wherein a slope of the speed dependent braking torque at motor speeds greater than the limit speed is approximated by the slope of the speed dependent braking torque at motor speeds below the limit speed.

10. The electric motor device of claim 9, wherein a respective time period of each braking switch position interval is dependent on the motor speed.

11. The electric motor device of claim 9, wherein a time period of at least one braking switch position interval is different from a time period of the subsequent open switch position interval.

12. The electric motor device of claim 9, wherein the at least two of the motor connections are electrically short-circuited in the braking switch position.

13. The electric motor device of claim 9, wherein, in the open switch position, a majority of the switching elements are in a blocking position.

14. The electric motor device of claim 13, wherein, in the open switch position, all of the switching elements are in the blocking position.

15. The electric motor device of claim 9, wherein the limit speed corresponds to a motor speed at which a voltage at the switching elements induced through the open switch position of the rotor is below a limit voltage.

* * * * *